United States Patent [19]

Thinlot

[11] Patent Number: 4,968,082
[45] Date of Patent: Nov. 6, 1990

[54] METHOD FOR THE AUTOMATIC GRIPPING OF OBJECTS, ENABLING THE PRESERVATION OF AT LEAST ONE REFERENCE ELEMENT RELATED TO IT, AND GRIP TO IMPLEMENT SAID METHOD

[75] Inventor: Michel Thinlot, Mont Les Seurre, France

[73] Assignee: Videocolor, Montrouge, France

[21] Appl. No.: 314,050

[22] Filed: Feb. 22, 1989

[30] Foreign Application Priority Data

Feb. 23, 1988 [FR] France .................. 88 02131

[51] Int. Cl.⁵ ............................................. B66C 1/42
[52] U.S. Cl. .................. 294/119.1; 294/86.4; 901/39; 414/736; 414/741
[58] Field of Search .............. 294/86.4, 103.1, 119.1; 901/31, 33, 36, 39; 414/736, 741

[56] References Cited

U.S. PATENT DOCUMENTS

| | | | |
|---|---|---|---|
| 4,273,506 | 6/1981 | Thompson et al. | 901/31 X |
| 4,377,305 | 3/1983 | Horvath | 901/31 X |
| 4,484,855 | 11/1984 | Inaba et al. | 414/736 |
| 4,621,852 | 11/1986 | Maki | 294/86.4 |
| 4,735,452 | 4/1988 | Nemoto | 294/86.4 X |
| 4,813,732 | 3/1989 | Klem | 294/103.1 |

FOREIGN PATENT DOCUMENTS 0252532 12/1985 Japan ........................... 901/31

Primary Examiner—Russell D. Stormer
Attorney, Agent, or Firm—Joseph S. Tripoli; Joseph J. Laks; Daniel E. Sragow

[57] ABSTRACT

The grip disclosed has a rotationally driven, threaded rod, with one part having a left-hand pitch while the other part has a right-hand pitch. The rod driving, by means of nuts and connection rods, has gripping arms that apply balanced forces to the object to be grasped. The arms and the threaded rod are floating with respect to the casing of the clamp, but can be locked as soon as the part is grasped.

10 Claims, 1 Drawing Sheet

METHOD FOR THE AUTOMATIC GRIPPING OF OBJECTS, ENABLING THE PRESERVATION OF AT LEAST ONE REFERENCE ELEMENT RELATED TO IT, AND GRIP TO IMPLEMENT SAID METHOD

BACKGROUND OF THE INVENTION

1. Field of the Invention

An object of the present invention is a method for the automatic gripping of objects, enabling the preservation of at least one geometrical reference element which is related to it, and a grip to implement said method.

2. Description of the Prior Art

In prior art machines for the winding of half cores of deflectors for cathode ray tubes, it is essential to determine the axis of revolution of these half cores with precision and to preserve its reference during the winding stage, in order to position the coil as precisely as possible with respect to the half core. It is also important not to break the half cores when they are gripped by an automatic manipulation grip which transfers them from a centering device to the winding machine.

For example, there is a known half core centering device, described in the French patent No. 2 559 547, which can be used to determine the axis of the revolution with precision despite the relatively high dimensional variation that cores might have in large batch production.

Moreover, there are also known half core gripping machines such as those used in winding machines of the "TAGA" make. These machines work properly but have drawbacks which make their use hardly practical and costly. For, these known grips have calibrated springs acting on the arms and capable of aging differently. These arms have to be strongly locked to keep them from any sliding motion caused by a pneumatically actuated system, entailing the risk that unbalanced thrust forces might be applied opposite to these arms causing the position of the reference axis to be lost. Furthermore, the gripping surfaces of the arms wear out quite quickly through frictional contact with the cores. Finally, the grip cannot be removed from its support without extensively dismantling it and separating it from the pneumatic system, thus complicating maintenance.

SUMMARY OF THE INVENTION

An object of the present invention is an automatic method for gripping objects which can be used to preserve a geometrical reference element related to it, a method that is easy to implement and automatically preserves said reference element while, at the same time, applying substantially balanced gripping forces.

Another object of the present invention is an automatic grip for gripping objects used to preserve a geometrical reference element related to said object, a grip which is easy to make and maintain, easy to use and does not lose its precision as and when the gripping surfaces get possibly worn out.

The method according to the invention, enabling the grasping of an object, immobilized on an appropriate support in a reference position, consists in:

grasping the object by means of at least two gripping sets, movable in a casing held still with respect to the support of the object, in making one of the sets approach a first face of the object by means of a motor force transmission element driven by a motor means, the transmission element being floating with respect to the support of the object;

making at least one other gripping set approach at least one other face of the object, by means of said transmission element;

stopping the driving of the transmission element as soon as the gripping sets clamp the object to a sufficient degree;

locking at least one of the sets with respect to the casing;

releasing the object from its support;

and shifting the casing with the object.

According to another characteristic of the invention, the transmission element is pulled towards the object by a spring placed in said casing. Alternatively, one of the gripping sets is pulled towards the object by a spring placed in said casing. According to yet another feature of the invention, the gripping sets are applied simultaneously to the object. Alternatively, the gripping sets are applied one after the other to the object.

The grip according to the invention, for the automatic gripping of objects, making it possible to preserve at least one geometrical reference element which is related to it, comprises, in a casing, at least two sets of gripping arms, each comprising at least one movable gripping arm, one motor force transmission element connected to these sets of arms and at least one spring placed between a fixed point of the casing and a movable point of the grip which is on one of the sets of arms or the transmission element. The transmission element has at least one degree of freedom with respect to the casing.

According to a preferred embodiment of the invention, the grip has two sets with two longitudinally movable, rectilinear arms each, the two arms of each of the two sets being connected by connection rods to a nut, the two nuts being driven in translational motion by a threaded rod. Advantageously, the threaded rod has two parts, one with a left-hand pitch and the other with a right-hand pitch, each of these two parts working with one of the two nuts, the spring being applied against a washer which is solidly joined to the threaded rod.

BRIEF DESCRIPTION OF THE DRAWINGS

The invention will be better understood from the following detailed description of an embodiment, taken as a non-restrictive example and illustrated by the appended drawiings, wherein.

DESCRIPTION OF A PREFERRED EMBODIMENT

Figure 1:
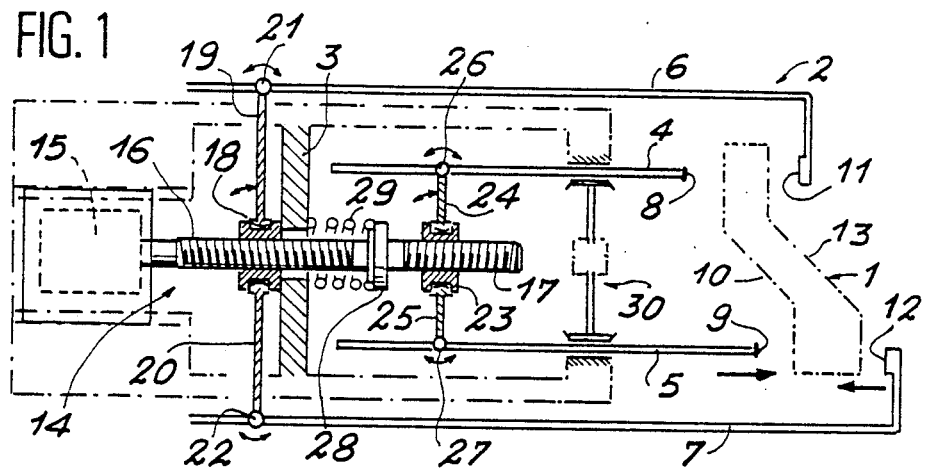
FIGS. 1 to 4 are schematic views of a grip according to the invention, shown in various positions.

The preferred embodiment described below relates to a grip for grasping half cores. This grip works with a centering device used to position the half cores in such a way that their axis of revolution coincides as far as possible with a fixed axis of this centering device. This grip makes it possible to present the half cores to an appropriate winding machine, always in the same way, namely their axis of revolution, their breaking plane and the notches made at the end of each breaking plane always occupy, in the coiling position in the machine, the same locations. This makes it possible always to achieve the windings on the cores always in the same way.

However, it is clear that the invention is not restricted to an application of this type, and that it can be implemented in order to grasp a part having any fixed shape or placed in a reference position or, at least, in a position for which it is possible to determine at least one geometrical reference element related to this part, and in order to move this part (by translation, rotation or complex motion) towards a second position for which this reference element can be found again. The reference element may be an axis or a plane of symmetry, as also as a rotation axis, a face of this part, etc.

The half core 1, shown in a sectional view in FIGS. 1 to 4, is supposed to be fixed in a centered position on a centering device (not shown) as described, for example, in the French Pat. No. 2 559 547.

The grip 2 has, in an appropriate casing, of which only a portion of a partition wall 3 has been shown, a first set of two arms 4, 5, and a second set of two arms 6, 7. These two arms are placed parallel to each another and are guided so that they can move only longitudinally. The arms 4, 5, have, at their free ends, gripping surfaces 8, 9, designed to be applied to the edges of the external surface 10 of the core 1. The arms 6, 7, have, at their free ends, gripping surfaces 11, 12, designed to be applied to the edges of the inner surface 13 of the core 1.

The grip 2 then has a motor force transmission element which, in the present case, is a threaded rod 14 that moves freely in an opening of the wall 3 and is rotationally driven by a motor 15 which is floating with respect to the support of the grip and may advantageously be uncoupled from the rod 14. A first half 16 of the threaded rod 14 has a left-hand pitch and the second half 17 has a right-hand pitch. In the first half 16, there is a nut 18 on which two connection rods 19, 20, are hinged. These two rods 19, 20, are respectively connected by hinges 21, 22, to the arms 6, 7. On the second half 17, there is a nut 23 on which two rods 24, 25, are hinged. These rods 24, 25 are respectively connected by hinges 26, 27, to the arms 4, 5.

A washer 28 is fixed to the rod 14, approximately at its middle. The part 16 of the rod 14 goes through the partition wall 3. A spring 29 is placed around the rod 14, between the partition wall 3 and the washer 28.

A device 30, to lock the arms of the grip 2, for example arms 4, 5, is fixed to this grip. This device 30 does not need to exert great force on the arms because, as explained below, the core 1 is clamped by the action of threaded rod 14. The device 30, therefore, is used only to maintain the reference position, and the grip is tightened on the part 1. Naturally, the device 30 can be controlled by any appropriate motor device, for example, an electromagnet or by a threaded rod driven rotationally by a motor.

With the help of FIGS. 1 to 4, we shall now explain the working of the device according to the invention.

In FIGS. 1 to 4, the half core 1 is shown in a centered position. In FIG. 1, the grip 2 is open and the spring 29 is compressed between the partition wall 3 the washer 28 because the nuts 18 and 23 are the closest to the middle of the threaded rod 14 and, hence, the closest to each other.

Figure 2:
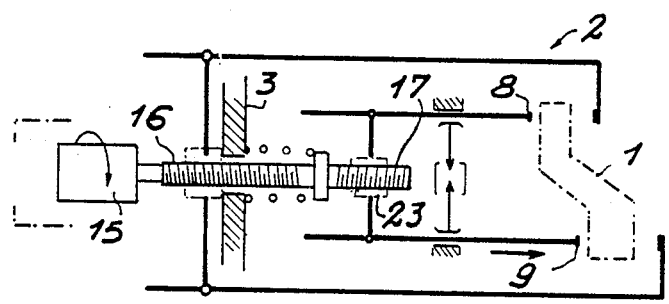

In FIG. 2, the motor 15 begins to drive the threaded rod 14 rotationally, in the indicated direction, i.e. in such a way as to move the nuts 18 and 23 away from each other. The spring 29 begins to relax, pushing the arms 4 and 5 towards the part 1.

Figure 3:
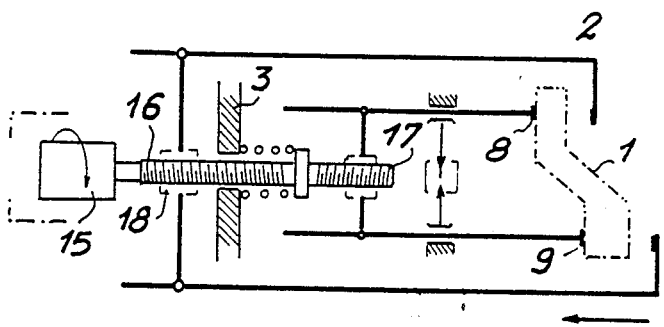
Figure 4:
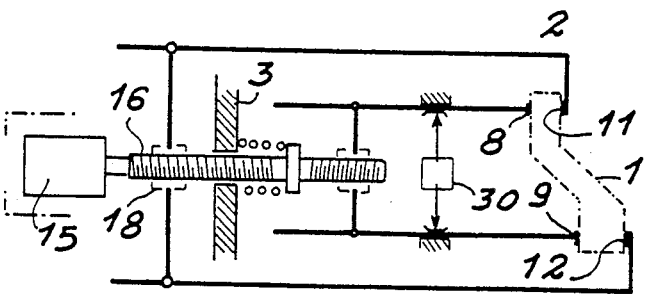

In FIG. 3, the motor 15 continues to run in the same direction and applies the surfaces 8 and 9 of the arms 4 and 5 to the surface 10 of the part 1. Owing to the hinged connections between the rods 24 and 25 and the nut 23, on the one hand, and the arms 4 and 5 on the other, the movements of the arms 4 and 5 are independent of each another. The result thereof is that, if one of these two arms gets applied to the part 1 before the other, there is no risk of damage to or breakage of this part a continuation of the forward motion of the nut 23 until the two arms are applied to the part 1. As soon as the two arms 4, 5, come to lean on the part 1 (by their surfaces 8, 9), the rod 14 begins to move away from the part 1, since the nut 23 can no longer move forward and since the motor 15 continues running.

This return movement of the rod 14, combined with the return of the nut 18, brings the part 1 closer to the surfaces 11, 12, of the arms 6, 7. As with the arms 4, 5, it may be the case that the arms 6, 7 are not applied simultaneously to the part 1, because of the hinges between the connection rods 19, 20, the nut 18 and the arms 6, 7. As soon as the two surfaces 11, 12, are in contact with the surface 13 of the part 1, the motor 15 stops. The stopping of the motor 15 may be controlled, for example, by pressure sensors placed on the surfaces 11, 12, or by a torque limiting device placed between the motor 15 and the rod 14. The grip is then in the position shown in FIG. 4. The device 30 locks the arms 4, 5.

The device for fixing the part 1 to its centering device can then be unclamped, and the grip 2, tightened on the part 1, can be shifted, the geometrical reference element of the grip being its support (symbolized by the partition 3), for which the position, with respect to the centering device on which the part 1 is fixed, can be defined with high precision. When the grip 2, tightened to the part 1, is shifted, this part 1 cannot move with respect to the support of the grip because the device 30 locks the arms 4 and 5 with respect to the support of the grip, and the threaded rod 14 prevents the arms 6, 7, from being unclamped with respect to the arms 4, 5.

It will be noted that the force exerted by the arms 4, 5, on the face 10 on the part 1 is substantially balanced by the force exerted on the other face 13 of the part, since the arms are floating with respect to the (immobilized) support of the grip the locking by the device 30, and since this locking does not influence the clamping of the part 1 by the arms of the grip.

What is claimed is:

1. A method for the automatic gripping of an object, immobilized on an appropriate support in a reference position, said method comprising the steps of:

grasping the object by means of a plurality of gripping sets, movable in a casing held still with respect to the support of the object, in making one of the plurality of gripping sets approach a first face of the object in a first direction by means of a motor force transmission element driven by a motor means, the transmission element being floating with respect to the support of the object;

making at least one other of the plurality of gripping sets approach at least one other face of the object in a direction opposite to the first direction, by means of said transmission element;

stopping the driving of the transmission element as soon as the gripping sets clamp the object to a sufficient degree;

locking said one other of the plurality of gripping sets with respect to the casing;

releasing the object from its support; and shifting the casing with the object.

2. A method according to claim 1, wherein one of the plurality of gripping sets is pulled towards the object by a spring placed in said casing.

3. A method according to claim 1, wherein the gripping sets are applied simultaneously to the object.

4. A method according to claim 1, wherein the gripping sets are applied one after the other to the object.

5. A method for the automatic gripping of an object, immobilized on an appropriate support in a reference position, said method comprising the steps of:

grasping the object by means of a plurality of gripping sets, movable in a casing held still with respect to the support of the object, in making one of the plurality of gripping sets approach a first face of the object in a first direction by means of a motor force transmission element driven by a motor means, the transmission element being floating with respect to the support of the object, the transmission element being pulled toward the object by a spring placed in said casing;

making at least one other of the plurality of gripping sets approach at least one other face of the object in a direction opposite to the first direction, by means of said transmission element;

stopping the driving of the transmission element as soon as the gripping sets clamp the object to a sufficient degree;

locking at least one of the plurality of gripping sets with respect to the casing;

releasing the object from its support; and shifting the casing with the object.

6. A grip for the automatic gripping of an object immobilized on an appropriate support in a reference position, comprising: in a casing, a plurality of sets of gripping arms, each comprising at least one movable gripping arm, one motor force transmission element connected to these set of arms, for moving a first set of said plurality of sets of gripping arms in a first direction and for moving another of said plurality of sets of gripping arms in a second direction, opposite to the first direction, and at least one spring placed between a fixed point of the casing and a movable point of the grip.

7. A grip according to claim 6, wherein the transmission element has at least one degree of freedom with respect to the casing.

8. A grip according to claim 6, wherein said movable point of the grip is located on one of the sets of arms.

9. A clamp according to claim 6, wherein said movable point is solidly joined to the transmission element.

10. A grip according to claim 6, comprising two sets of gripping arms with two longitudinally movable, rectilinear arms each, the two arms of each of the two sets of gripping arms being connected by connection rods to a nut, the two nuts being driven in translation motion by a threaded rod, said threaded rod having two parts, one with a left-hand pitch and the other with a right-hand pitch, each of these two parts working with one of the two nuts, the spring being applied against a washer which is solidly joined to the threaded rod.

* * * * *